United States Patent [19]
Yamashita et al.

[11] Patent Number: 5,101,148
[45] Date of Patent: Mar. 31, 1992

[54] ELECTRIC MOTOR ACTUATOR

[75] Inventors: Seizi Yamashita, Katsuta; Kunio Miyashita, Hitachi; Hironori Okuda, Kobe, all of Japan

[73] Assignee: Hitachi, Ltd., Tokyo, Japan

[21] Appl. No.: 511,925

[22] Filed: Apr. 16, 1990

Related U.S. Application Data

[63] Continuation of Ser. No. 718,276, Apr. 1, 1985, abandoned.

Foreign Application Priority Data

Mar. 30, 1984 [JP] Japan ................... 59-60727

[51] Int. Cl.$^5$ ............................................ G05D 13/00
[52] U.S. Cl. ........................ 318/603; 318/630
[58] Field of Search ............... 318/9, 15, 600, 601, 318/602, 603, 630

[56] References Cited

U.S. PATENT DOCUMENTS

| | | | |
|---|---|---|---|
| 3,668,377 | 6/1972 | Inaba | 318/630 X |
| 3,808,431 | 4/1974 | Hedrick | 341/2 |
| 4,599,601 | 7/1986 | Rammelsberg | 341/11 |
| 4,724,371 | 2/1988 | Ito et al. | 318/603 |

*Primary Examiner*—Bentsu Ro
*Attorney, Agent, or Firm*—Antonelli, Terry, Stout & Kraus

[57] ABSTRACT

An actuator in which, when the reduction ratio of a reduction gear unit is 1/N, the number of pulses of a second encoder is set to be equal to N times (the number of pulses of a first encoder), whereby a pulse processing circuit for detecting a torsion angle is made remarkably simple.

3 Claims, 3 Drawing Sheets

ELECTRIC MOTOR ACTUATOR

This application is a continuation of application Ser. No. 718,276, filed on Apr. 1, 1985.

BACKGROUND OF THE INVENTION

The present invention relates to an improvement in an electric motor actuator in which an output shaft of a reduction gear unit is coupled to such a machine element as a robot arm.

FIG. 1 shows, in a model form, a conventionally known actuator which is a combination of an electric motor and a reduction gear unit. In the drawing, a reduction gear unit 2 is driven at its primary side by an output shaft of an electric motor 1 and is coupled at its secondary side to such a machine element 3 as a robot arm so that the machine element can be eventually set or shifted at or to a desired position. And the control of the actuator is effected by adjusting the rotational angle of the shaft of the motor. More specifically, encoders $E_1$ and $E_2$ are mounted respectively on the rotating shaft of the motor and on the output shaft of the reduction unit. A method of controlling the actuator by counting the number of pulses of the each encoder is excellent in the operational accuracy of the actuator, since it can advantageously correct the backlash and torsion caused by the reduction unit.

According to this method, pulse signals generated from the two encoders during rotation of the shafts of the motor and reduction unit are processed to find a difference in rotational angle between the motor shaft and the reduction unit shaft and thereby to know the degree or magnitude of the backlash and torsion, whereby the state of the actuator is recognized.

However, this method has a defect that the whole control circuit becomes more complex than that in a method for controlling the motor alone, since the pulse processing circuit for detecting the rotational angle difference becomes complex.

SUMMARY OF THE INVENTION

It is an object of the present invention to provide a control circuit with a simple arrangement which corrects the backlash caused by a reduction gear unit and the torsion generated in a rotating shaft system to provide a high operational accuracy to an actuator.

In accordance with the present invention, when the reduction ratio of a reduction gear unit is 1/N, a pulse processing circuit for calculating a rotational angle difference can be made remarkably simple by setting the number of pulses of a second encoder to be equal to N times (the number of pulses of a first encoder).

DESCRIPTION OF THE PREFERRED EMBODIMENT

Figure 4:
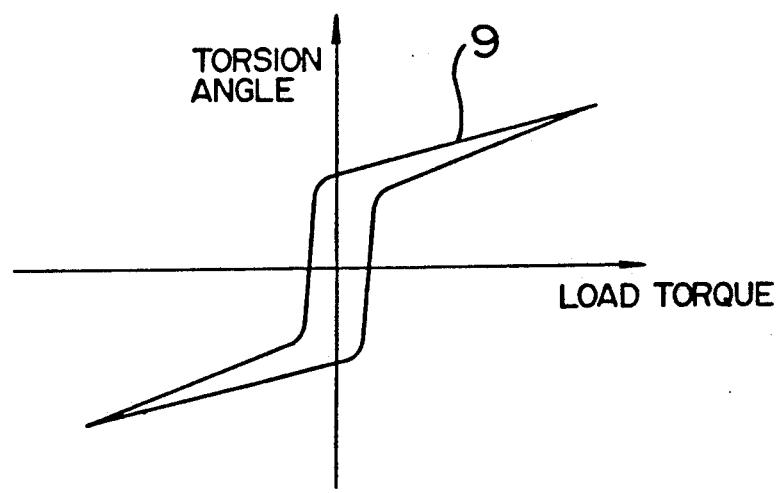
FIG. 4 is a hysteresis curve showing a relationship between the load torque of the actuator and the torsion angle of a shaft of the reduction gear unit in accordance with the present invention.

Explanation will be made as to the technical idea of the present invention. First, explanation will be made as to why the status of a reduction gear unit having such a hysteresis loop as shown in FIG. 4 can be recognized on the basis of signals sent from first and second encoders $E_1$ and $E_2$.

Figure 3:
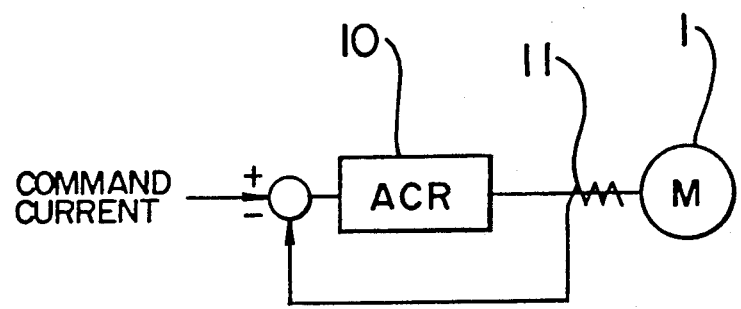
FIG. 3 is a general block diagram of a current control circuit of a motor used in the actuator according to the embodiment of the present invention.

A control circuit of an electric motor generally contains such a current control circuit as shown in FIG. 3. Accordingly, when a current control ACR 10 is sufficiently high in gain and the response frequency is high, the torque of the motor can be known from the value of the command current. When the motor is of a DC type the torque can be replaced with the value of a current, whereas when the motor is of an AC type the torque can be known by converting the current to a torque using an appropriate current-torque conversion factor.

When the reduction ratio of the reduction gear unit is 1/N, the load torque of the reduction unit corresponds to N x (the torque of the motor). When a microcomputer is used for the control circuit, knowing the torque from the current can be realized in a software manner.

Therefore, for the purpose of recognizing the status of the reduction gear unit, it is sufficient only to know the twist or torsion direction of the reduction unit.

When an incremental encoder is used, a rotational angle $\theta_1$ of the motor can be found from two phase signals $\theta_1$ and $\theta_2$ of the encoder on the basis of a circuit 4 for discrimination between forward and backward turns of the motor and an up/down counter 5. Similarly, a rotational angle $\theta_2$ of an output shaft of the reduction gear unit can be found from an output signal of the encoder $E_2$ mounted on the output shaft of reduction unit by utilizing a circuit 6 and counter 7.

Let $PPR_1$ be the number of pulses generated from the encoder $E_1$ when the motor shaft makes one revolution. When the motor shaft rotates in $\theta_1$ degrees, the number $P_1$ of pulses generated from the encoder $E_1$ is as follows;

$$P_1 = PPR_1 \times \frac{\theta_1}{2\pi} \quad (1)$$

Therefore, rotational angle $\theta_1$ of the generated from motor shaft is obtained by counting the number $P_1$ of pulses.

Let $PPR_2$ be the number of pulses generated from the encoder $E_2$ when the output shaft of the reduction unit makes one revolution. When the output shaft of the reduction unit rotates in $\theta_2$ degrees, the number $P_2$ of pulses generated from the encoder $E_2$ is as follows;

$$P_2 = PPR_2 \times \frac{\theta_2}{2\pi} \quad (2)$$

Therefore, rotational angle $\theta_2$ of the output shaft of the reduction unit is obtained by counting the number $P_2$ of pulses.

Accordingly, if there is no torsion in the reduction unit, then the following equation (3) is satisfied.

$$N\theta_2 = \theta_1 \quad (3)$$

If there exists a torsion in the reduction unit, then the torsion angle is written as follows.

$$\theta_2 - \frac{\theta_1}{N} = P_2 \times \frac{2\pi}{PPR_2} - P_1 \times \frac{1}{N} \times \frac{2\pi}{PPR_1} \quad (4)$$

In this invention, the encoder $E_2$ has a higher resolution than encoder $E_1$ and provides a greater number of pulses than encoder $E_1$ such that the pulse number $PPR_2$ of the encoder $E_2$ is set to be equal to N x (the pulse number $PPR_1$ of the encoder $E_1$), that is, $$PPR_2 = N \times PPR_1 \quad (5)$$

Thus, the equation (4) is put into the following form (6).

$$\theta_2 - \frac{\theta_1}{N} = K(P_2 - P_1) \quad (6)$$

It will be seen from the equation (6) that a difference in pulse number between the motor and the reduction unit is proportional to the torsion angle of the reduction unit.

Therefore, if there is a difference between the both encoders $E_1$ and $E_2$ in the number of pulses counted in the counters, then the difference signal indicates the magnitude of the torsion angle.

Figure 1:
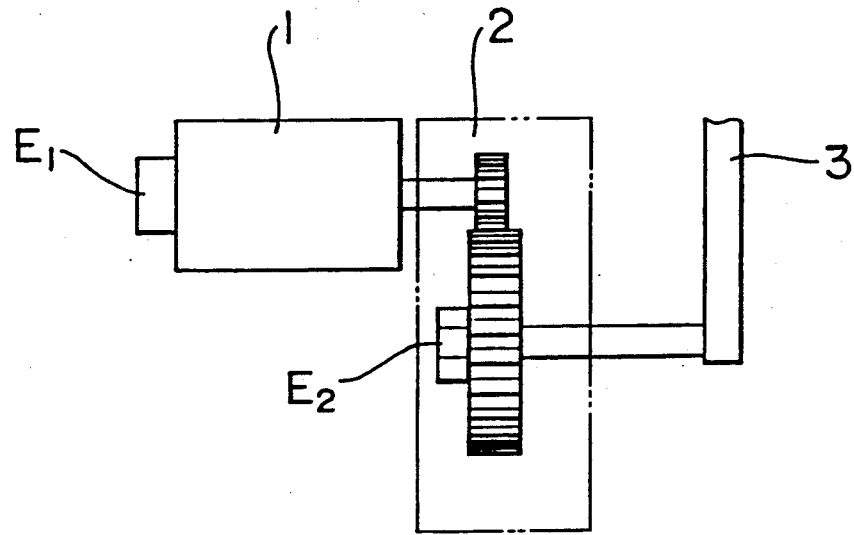
FIG. 1 is a front view showing an arrangement of an electric motor actuator conventionally proposed.
Figure 2:
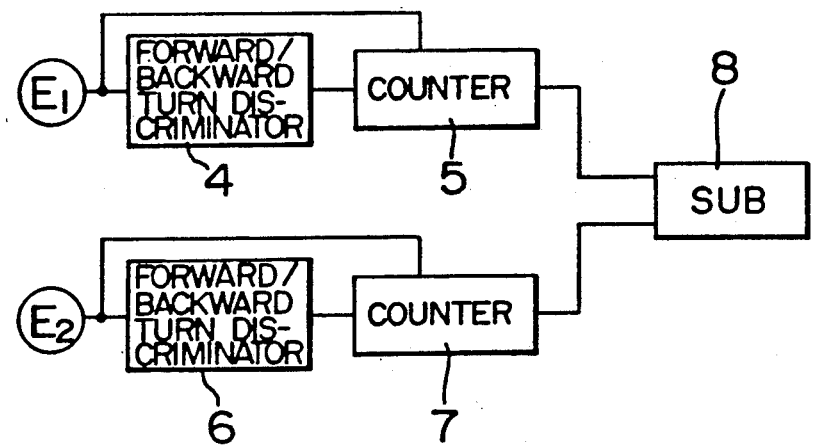
FIG. 2 is a circuit for detecting a torsion angle of a shaft of a reduction gear unit used in the actuator in accordance with the present invention.

FIG. 2 shows an embodiment of a torsion angle detection circuit in accordance with the present invention in which an arithmetic element (substractor SUB) 8 performs a subtraction operation over the pulse numbers of the both encoders on hardware basis. There is shown another embodiment of the torsion angle detection circuit in FIG. 5 wherein the both signals of the encoders are applied to a single up/down counter 12 so that an output signal of the counter 12 is proportional to the torsion angle.

Figure 5:
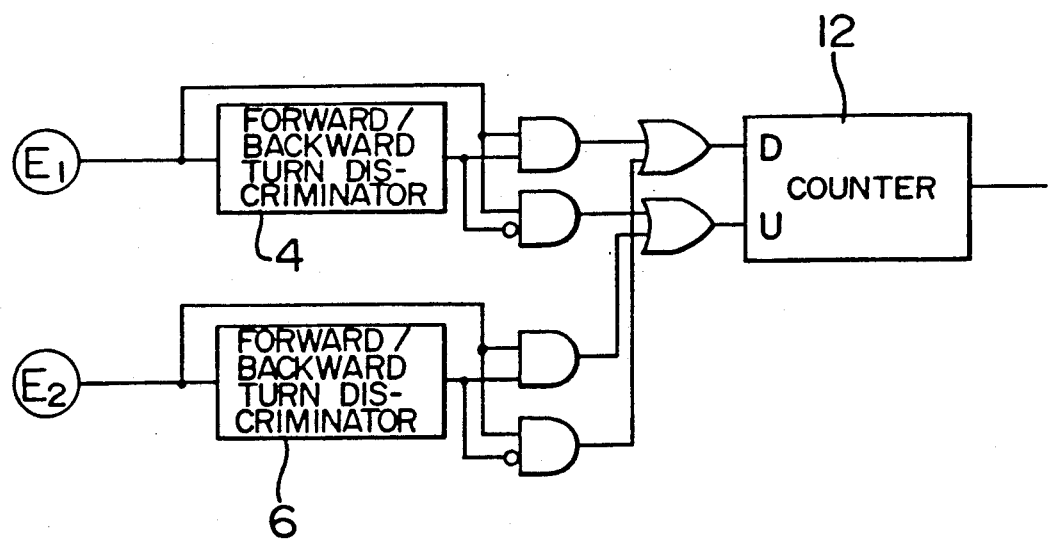
FIG. 5 is a circuit diagram showing a torsion angle detection circuit according to the embodiment of the present invention.

If the pulse numbers $PPR_1$ and $PPR_2$ of the encoders $E_1$ and $E_2$ are not set to satisfy the relationship (5), then it is impossible to detect the torsion angle with such a simple circuit configuration as shown in FIG. 5, that is, the torsion angle detection circuit must be made complicated. For this reason, it has been so far difficult to realize the improved accuracy of the motor actuator through correction of the torsion.

In accordance with the present invention, on the other hand, the pulse processing circuit for detecting the torsion angle can be realized with a highly simple arrangement, whereby it becomes easy to carry out the correction of the torsion angle to improve the actuator in the operational accuracy, finding a wide range of industrial application.

We claim:

1. An electric motor actuator comprising:

an electric motor provided with reduction gear means;

first encoding means mounted on a rotation shaft of said motor for generating output pulses in accordance with the rotation of said rotation shaft of said motor, said first encoding means generating output pulses of a number $PPR_1$ for each revolution of said rotation shaft of said motor;

second encoding means mounted on an output shaft of said reduction gear means for generating output pulses in accordance with the rotation of said output shaft of said reduction gear means, said second encoding means generating output pulses of a number of $PPR_2$ for each revolution of said output shaft of said reduction gear means; and means responsive to the output pulses from said first and second encoding means for calculating a difference between the output pulses from said first and second encoding means to thereby detect a torsion corresponding to an erroneous difference in rotation between said rotation shaft of said motor and said output shaft of said reduction gear means;

wherein the respective numbers $PPR_1$ and $PPR_2$ of said output pulses of said first and second encoding means are set to satisfy an expression $$PPR_2 = NPPR_1$$

under a condition where no torsion exists in said reduction gear means, N being a reciprocal number of a reduction ratio of said reduction gear means so that said second encoding means provides a number of output pulses greater than the number of output pulses provided by said first encoding means and equal to the number of output pulses provided by said first encoding means times the reciprocal number of the reduction ratio of said reduction gear means.

2. An electric motor actuator according to claim 1, wherein said means responsive to the output pulses from said first and second encoding means for calculating a difference includes first and second up/down counting means for counting output pulses from said first and second encoding means, respectively, and means for calculating a difference between respective counts of said first and second up/down counting means to thereby detect a torsion corresponding to an erroneous difference in rotation between said rotation shaft of said motor and said output shaft of said reduction gear means.

3. An electric motor actuator according to claim 1, wherein said means responsive to the output pulses from said first and second encoding means for calculating a difference includes up/down counting means for counting the output pulses from said first and second encoding means and for calculating a difference therebetween.

* * * * *